United States Patent [19]

Fluegel et al.

[11] Patent Number: 4,713,982
[45] Date of Patent: Dec. 22, 1987

[54] INTEGRAL GEAR BOX AND ELECTRICAL GENERATING SYSTEM

[75] Inventors: Theodore D. Fluegel; Daniel M. Ryan, both of Rockford, Ill.

[73] Assignee: Sundstrand Corporation, Rockford, Ill.

[21] Appl. No.: 813,784

[22] Filed: Dec. 27, 1985

[51] Int. Cl.[4] .................. F16H 37/08; F16H 47/04; F02C 7/275

[52] U.S. Cl. ..................... 74/686; 60/39.83; 60/39.142; 60/491; 74/687; 74/731

[58] Field of Search ............... 74/686, 687, 730, 731; 60/490, 491, 39.142, 39.83; 165/51

[56] References Cited

U.S. PATENT DOCUMENTS

| | | | |
|---|---|---|---|
| 3,733,924 | 5/1973 | Zentz | 74/687 |
| 4,315,442 | 2/1982 | Cordner | 74/687 |
| 4,498,525 | 2/1985 | Smith | 165/51 |
| 4,557,160 | 12/1985 | Reynolds | 74/687 |
| 4,605,358 | 8/1986 | Burnandt | 74/730 X |
| 4,609,842 | 9/1986 | Aleem et al. | 74/686 X |

Primary Examiner—Allan D. Herrmann
Attorney, Agent, or Firm—Wood, Dalton, Phillips, Mason & Rowe

[57] ABSTRACT

Reductions in weight, frontal area and overhang moment in an aircraft engine gear box and electrical generating system are achieved in a construction including a gear box housing 20 provided with an input shaft 16 connectable to a power take-off 12. A differential 76 is disposed within the housing 20 and includes a carrier shaft 72 mounting meshed planet gears 82, 84. The differential includes a control ring gear 88 to mesh with the planet gear 84 and an output ring gear 92 meshed with the planet gear 82. The carrier shaft 72 is coupled to the input shaft 16. A hydraulic speed trimmer 54 is mounted on the exterior of the housing 20 and includes two pump/motor units 124, 128, each having a shaft 108, 110, extending into the housing 20 to be respectively connected to the carrier shaft 72 and the control ring gear 88. A generator 102 is mounted on the gear box housing 20 and includes a shaft 100 extending into the interior 22 of the housing 20 to be coupled to the output ring gear 92.

4 Claims, 3 Drawing Figures

FIG. 1

INTEGRAL GEAR BOX AND ELECTRICAL GENERATING SYSTEM

FIELD OF THE INVENTION

This invention relates to a gear box assembly for turbine engines, and more specifically, to such an assembly wherein provision is made for electrical power generation.

BACKGROUND OF THE INVENTION

Turbine engines have long been employed in medium and high speed aircraft. Such engines conventionally employ power take-off shafts which extend to a gear box. The gear box, in turn, provides for distribution of power from the engine to other system components. For example, the gear box typically will provide power to an integrated drive generator (IDG), one or more hydraulic pumps, a fuel pump or fuel distribution system, etc. In addition, a starter for the engine, such as an air starter, may be connected to the engine via the gear box.

The continuing trend towards increased efficiency of such systems necessitates (1) the minimization of weight, (2) the optimization of aerodynamic profile, and (3) the minimization of heat rejection due to churning losses in associated hydraulic systems. These goals must be achieved while maintaining or enhancing the reliability of the system. Conventional gear box assemblies supply power to self-contained IDG's which typically have their own oil system including pumps, oil coolers and the like. Careful oil level management is required in such systems in order to limit the amount of heat generated by churning oil in the generator air gap and in the gearing of a constant speed drive conventionally associated therewith while all the while guaranteeing system operability for all attitudes of the aircraft of which the system is part.

Further, arranging all of the IDG components in a single packet may limit the degree to which the aerodynamic profile of the package may be optimized for minimal frontal area of the engine nacelle to minimize aerodynamic drag.

The present invention is directed to overcoming one or more of the above problems.

SUMMARY OF THE INVENTION

It is the principal object of the invention to provide a new and improved gear box assembly for use with turbine engines employed in aircraft. More specifically, it is an object of the invention to provide such a gear box that has minimum weight, minimal frontal area for reduced drag and improved system reliability.

An exemplary embodiment of the invention achieves the foregoing object in a power plant including a turbine with a shaft and a power take off from the shaft along with a gear box and accessory unit. There is provided a gear box housing and an input shaft to the housing which is connected to the power take off. A differential is located within the housing and includes a carrier shaft mounting first and second meshed planet gears, a control ring gear meshed with one of the planet gears, and an output ring gear meshed with the other of the planet gears. The carrier shaft is coupled to the input shaft. A speed trimming device is mounted on the exterior of the gear box housing and in the exemplary embodiment consists of two hydraulically interconnected axial piston pump/motor units conventionally termed a hydraulic log. At least one of the units is a variable displacement unit. Each of the units has a shaft entering the gear box housing, and the shafts are respectively coupled to the carrier shaft and the control ring gear. The hydraulic speed trimmer further includes a displacement control for the variable displacement unit and a priming pump. The speed trimmer is preferably completely filled with hydraulic fluid to optimize all-attitude performance.

A generator is mounted on the exterior of the housing and has a shaft extending into the housing which is coupled therein to the output ring gear.

As a consequence of this construction, the frontal area of the constant speed drive portion of an IDG is minimized by disposition of the differential within the gear box rather than in a separate housing which in turn would house both the differential and the speed trimmer.

As a further consequence of this construction, a considerable weight savings is realized. Housing material which, in the prior art construction, was required to contain the differential as well as the IDG scavenge pump and sump is largely eliminated as such components are now contained by the gear box housing which remains relatively unchanged. The coupling of the generator and differential oil scavenging requirements with those in an existing gear box results in a moderate resizing of the lubrication and scavenging pumps. However, the elimination of separate dedicated scavenge pumps and the like for the conventional IDG provides an overall weight reduction. Where the speed trimmer is completely oil filled, the invention allows the elimination of the rotating deaerator conventionally used in prior art IDG's thereby reducing system complexity which increases reliability as well as providing a weight reduction. Additionally, integration of the differential and generator oil lubrication and/or cooling requirements with those of the gear box provide for a more weight efficient external cooling circuit design as will be seen.

Furthermore, the overhung moment stressing the gearbox is reduced over that provided by a typical in-line IDG since the speed trimmer and generator are mounted at different locations on the sides of the gear box.

In a preferred embodiment, the generator is a starter/generator so that frontal area and weight necessitated by a starter separate from an IDG may be eliminated.

In a preferred embodiment of the invention, both of the hydraulic units are variable displacement units. One is operable to control the speed at which the starter/generator is driven by the output ring gear which also serves as an input ring gear during engine starting. The other unit is operable to control the speed at which the input shaft is driven by the starter/generator.

The invention further contemplates that the system include a fuel system drive gear within the gear box housing which is coupled to the input shaft. The fuel system drive gear is operative to drive a fuel pump mounted on the exterior of the housing. A heat exchanger, including a liquid flow path in heat exchange relation with the speed trimmer, is provided, and means are included which define a fuel flow path connected to the pump and including the liquid flow path. As a consequence, fuel may serve as a coolant for cooling the hydraulic log.

The invention contemplates that the hydraulic speed trimmer package contain a cooler for dissipating heat imparted to the oil during system operation. Means are defined by which fuel is used as a cooling medium, although, in some instances, hydraulic oil is also suitable.

In a preferred embodiment, the coolant flow passages are integral with the speed trimmer housing, and specifically include liquid passages in the speed trimmer housing wall.

Other objects and advantages will become apparent from the following specification taken in connection with the accompanying drawings.

DESCRIPTION OF THE DRAWINGS

FIG. 1 is a somewhat schematic, sectional view of a gear box made according to the invention and taken approximately along the line 1—1 in FIG. 3;

DESCRIPTION OF THE PREFERRED EMBODIMENT

Figure 1:
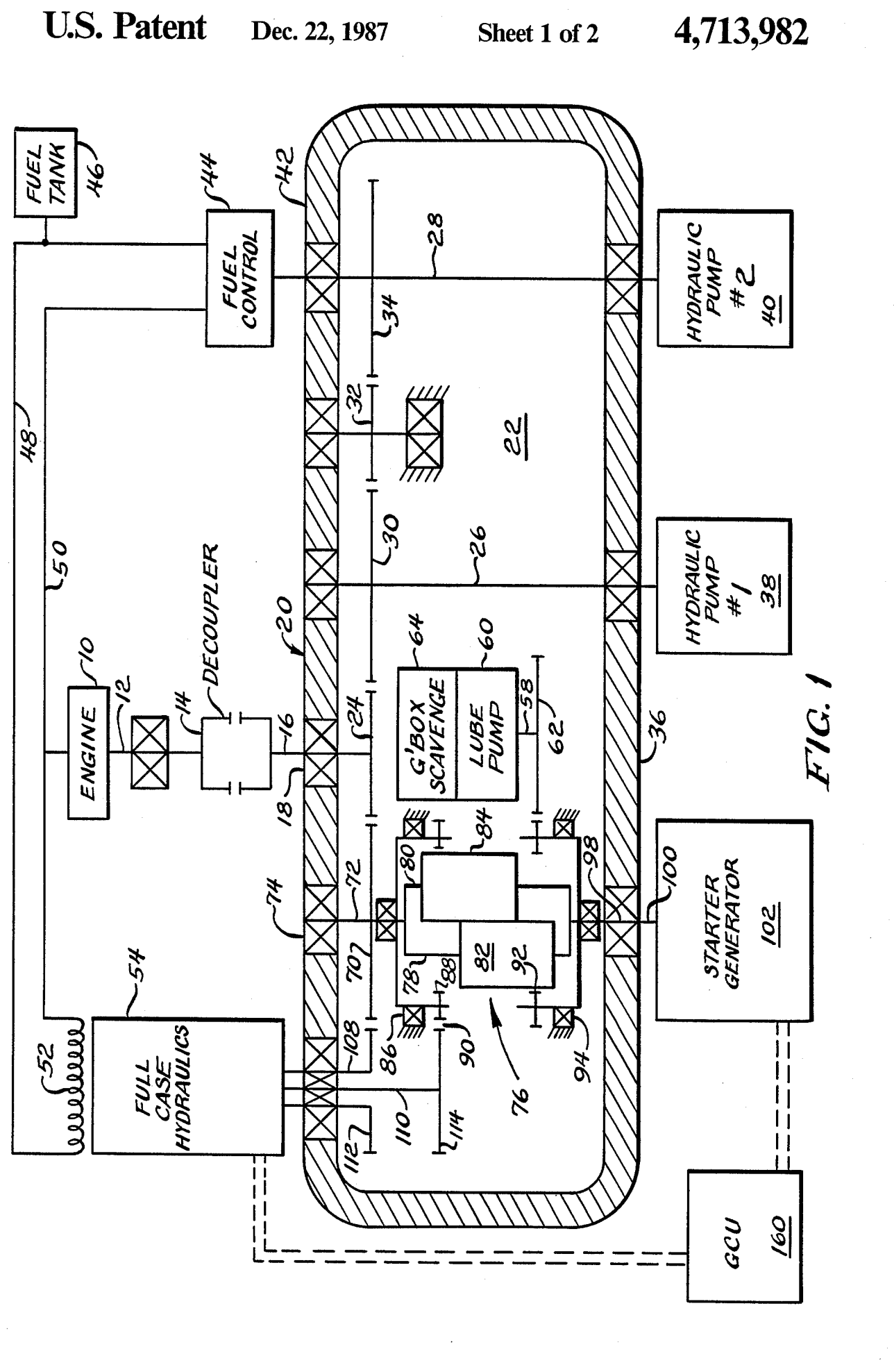
Figure 2:
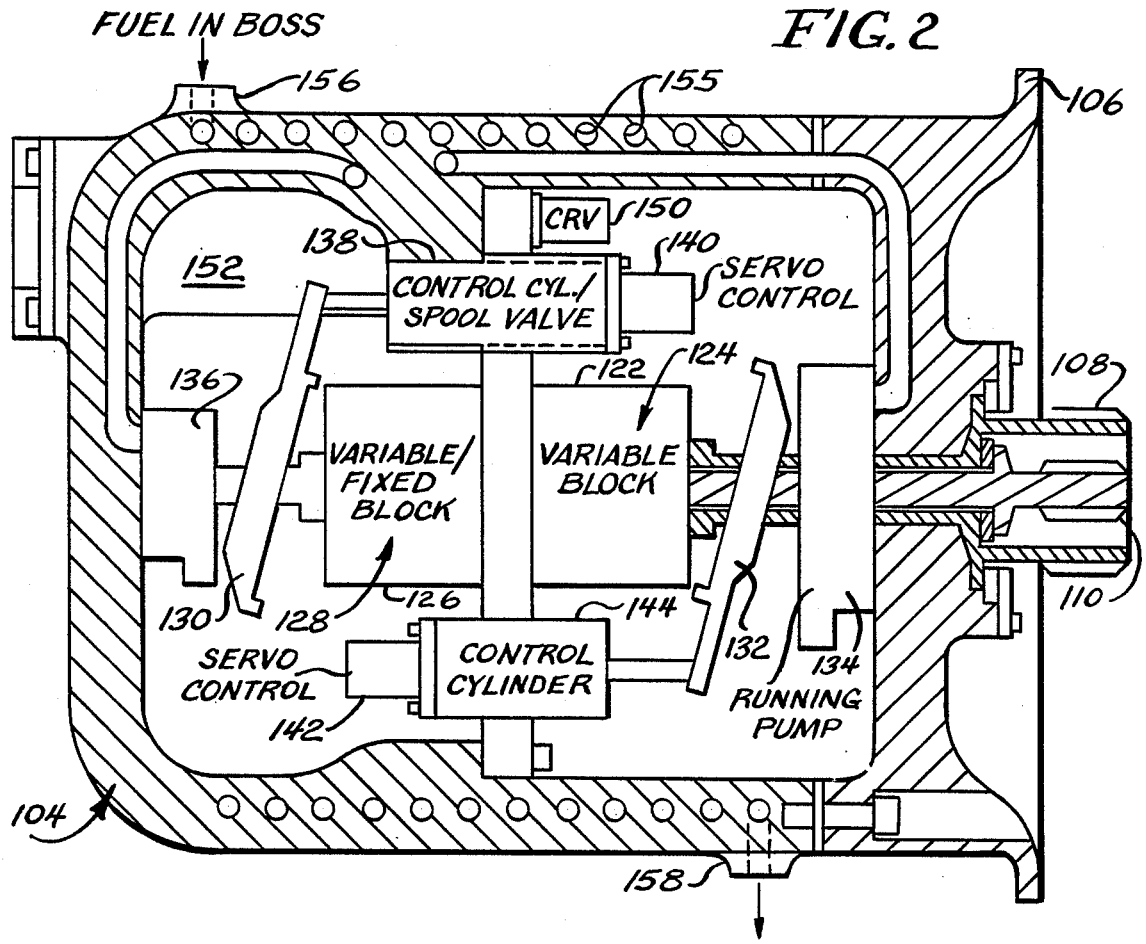
FIG. 2 is a somewhat schematic, sectional view of a hydraulic speed trimmer employed in a preferred embodiment of the invention.

An exemplary embodiment of a gear assembly and associated accessory components, including electrical generating components, is illustrated in the drawings. With reference to FIG. 1, the same is adapted to be associated with a turbine engine 10 having a shaft to which is connected a power take-off shaft 12. The power take-off shaft 12 extends through a conventional de-coupler 14 to an input shaft 16 which is journalled by bearings 18 in a gear box housing generally designated 20.

The shaft 16 enters the interior 22 of the housing 20 to mount a gear 24. In a typical case, additional shafts 26 and 28 are journalled by bearings as shown within the gear box housing 20. The shaft 26 mounts a gear 30 meshed with the gear 24 so the shaft 26 is driven in unison with the shaft 16.

A suitably journalled idler gear 32 is meshed with the gear 30 and in turn is meshed with a gear 34 coupled to the shaft 28; so again, the shaft 28 rotates with the input shaft 16.

The shaft 26, at one end, extends through a wall 36 of the housing 20 to drive, for example, a first hydraulic pump 38. The hydraulic pump 38 is employed in the hydraulic systems of an aircraft in a conventional fashion.

The shaft 28 likewise extends through the wall 36 to be in driving relation with, for example, a second hydraulic pump 40 which is likewise employed in connection with the hydraulic systems found in an aircraft. In addition, the shaft 28 extends through a wall 42 of the housing 20 to drive a fuel control or fuel pump 44. The fuel pump 44 receives fuel from one or more fuel tanks 46 and pumps the same to the engine 10 as indicated by a line 48.

As is typical in aircraft, an excess of fuel is delivered along the line 48, and an overflow or by-pass line 50 is provided to route the excess fuel back to the fuel tank 46 or the inlet to the fuel pump 44. In the case of the instant invention, the line 50 includes a liquid flow path 52 forming part of a heat exchanger in fluid communication and heat exchange relation with a hydraulic speed trimmer, generally designated 54, employed in the system. In this way, excess fuel may be utilized as coolant to absorb heat generated within the hydraulic speed trimmer 54. The invention also contemplates that the liquid flow path 52 forming part of the heat exchanger need not be employed in the recirculating line, but could be employed in the line 48 if desired.

Turning now to the input gear 24 on the input shaft 16, the same is in mesh with a gear 70 on a shaft 72 journalled by bearings 74 in the housing 20. The shaft 72 is a carrier shaft for a differential, generally designated 76, and mounts a conventional carrier composed of two shafts 78 and 80 equally offset, but parallel to the rotational axis of the shaft 72.

Each of the shafts 78 and 80 defining the carrier in turn journals respective planet gears 82 and 84 which are partially axially offset from each other, as illustrated in FIG. 1, but are in mesh with each other.

Suitable bearings 86 within the housing journal a conventional ring gear 88. The ring gear 88 is meshed with the planet gear 84, but not the planet gear 82, and has exterior gear teeth 90 for purposes to be seen.

The differential 76 also includes an input/output ring gear 92 journalled by bearings 94 within the housing 20 and engaged with the planet gear 82, but not the planet gear 84. The input/output ring gear 92 is connected by a spline shown schematically at 98 to the shaft 100 of a conventional starter/generator 102. The starter/generator is suitably mounted to the housing 20 on the side 36 thereof. The input/output ring gear 92 is also meshed with the gear 62 carried by the shaft 58, thus placing the input/output ring gear 92 in driving relation to the lubrication pump 60 which directs lubrication to those points in the system requiring it and the gear box scavenging pump 64 which is used for conventional purposes.

The hydraulic speed trimmer 54 includes a housing 104 having a flange 106 (FIG. 2) which is mounted to the side 42 of the housing 20 by any suitable means. First and second coaxial shafts 108 and 110 extend from the log 54 into the housing 20 to respectively mount gears 112 and 114. The gear 112 is meshed with the gear 70 on the carrier shaft 72 while the gear 114 is meshed with the external teeth 90 on the control ring gear 88.

As is well known, a typical hydraulic log includes two pump/motor units which are hydraulically interconnected. In the usual case, one of the units will be of variable displacement, while the other will be a fixed displacement. Depending upon the use to which the invention is put, this arrangement may be maintained. However, in a highly preferred embodiment of the invention, where a starter/generator such as that shown at 102 is employed, as opposed to a generator only, the fixed unit will be replaced with a variable/fixed unit.

As schematically illustrated in FIG. 1 and as shown in FIG. 2, the shaft 108 is connected to the variable hydraulic unit in the speed trimmer 54, while the shaft 110 is connected to the fixed unit, or the varaible/fixed unit replacing the fixed unit, in the hydraulic speed trimmer.

More particularly, and with reference to FIG. 2, within the housing 104, the shaft 108 is associated in a conventional fashion with the block 122 of the variable displacement hydraulic unit, generally designated 124, of the hydraulic speed trimmer 54.

The shaft 110, in turn, is telescopically received within the shaft 108 and passes through the block 122 of the variable unit 124 to be operatively associated with the variable/fixed block 126 of a variable/fixed displacement hydraulic unit, generally designated 128. The unit 128 includes a variable/fixed wobbler 130, although a fixed displacement unit could be used as the unit 128 when an engine starting function is not required. A variable wobbler is shown somewhat schematically as 132 in association with the variable displacement hydraulic unit 124.

Also contained within the housing 104 is a conventional charge pump 134 which acts to provide hydraulic fluid to the units 124 and 128 in a conventional fashion when the system is being utilized for power generation as opposed to engine starting. A second charge pump 136 is in driven relation with the shaft 110 and is used to provide hydraulic fluid to the units 124 and 128 during the engine start-up mode. The transfer of operation from the variable/fixed driven pump 136 to the variable driven pump 134 is accomplished using the integral control cylinder/spool valve 138, the position of which is controlled by the speed responsive servo control 140. Another servo control 142, also of conventional configuration, is provided to exercise control over a control cylinder 144 with a variable unit 124 which controls the position of the variable wobbler 132 to ultimately vary the displacement of the variable unit 124 as required. Desirably, a charge relief valve 150 and a filter 152 may be included in the hydraulic speed trimmer 54.

The housing 104 for the speed trimmer 54 is provided with, for example, a spiral shaped conduit 155 terminating in bosses 156 and 158 and which defines the liquid flow path 52 of the heat exchanger.

The exemplary embodiment, of course, operates in two modes, namely, a power generation mode and an engine starting mode.

In the power generation mode, the wobbler 130 for the variable/fixed displacement unit 128 is maintained in a particular position so that the unit 128 acts as a fixed displacement unit. Overall operation of the components in the hydraulic speed trimmer 54, and the differential 76 is then as in conventional IDG operation to maintain constant speed operation of the generator 102, typically to provide the 400 Hertz output utilized in aircraft systems.

In the engine starting mode, upon the initiation of a starting operation, there will be considerable inertial resistance to rotation of the carrier shaft 72, due to its ultimate connection to the engine 10. Consequently, it will remain relatively stationary with the input from the starter/generator 102 acting through the input/output ring gear 92 to rotate the planet 82 on its shaft 78 which in turn will rotate the planet 84 on its shaft 80 while the shafts 78 and 80 remain relatively stationary.

Rotation of the planet 84 will in turn result in rotation of the control ring gear 88 which in turn will drive the shaft 110 to cause rotation of the block 126 in a conventional fashion. At this point, the wobbler 130 is adjusted so that the block 126 will be spinning or rotating but not pumping any hydraulic fluid to the block 122. Further, the control cylinder spool valve 138 will be positioned at this time so as to allow for the delivery of hydraulic fluid from the starting charge pump 136 to the hydraulic circuit including the units 124, 128.

When a desired speed of rotation is achieved, the wobbler 130 is then adjusted (stroked), to cause hydraulic fluid to be pumped from the block 126 to the block 122, initially to cause low speed, high torque rotation of the block 122. This, in turn, will result in rotation of the shaft 108 which, through the gear 112 will drive the gear 70 and ultimately, the input gear 24. This driving force will be conveyed to the power take-off to the engine 10. In actuality, the power for starting the engine 10 will simultaneously be delivered to the carrier shaft 72 by the forces tending to cause rotation of the shaft 78 and 80 as applied thereto via the application of the output of the starter/generator 102 to the planet 82.

As the engine starting cycle is completed, the fixed/variable wobbler 130 is repositioned to a power generating mode orientation.

In both generating modes of operation, the positions of the wobblers are controlled by the servo controls which receive electrical signals from a conventional generator control unit 156 and which are dependent upon generator speed.

Simultaneously with the repositioning of the variable wobbler 130 for power generation, the control cylinder spool valve 138 is repositioned to port hydraulic fluid from the running charge pump to the hydraulic circuit including the units 124 and 128.

Figure 3:
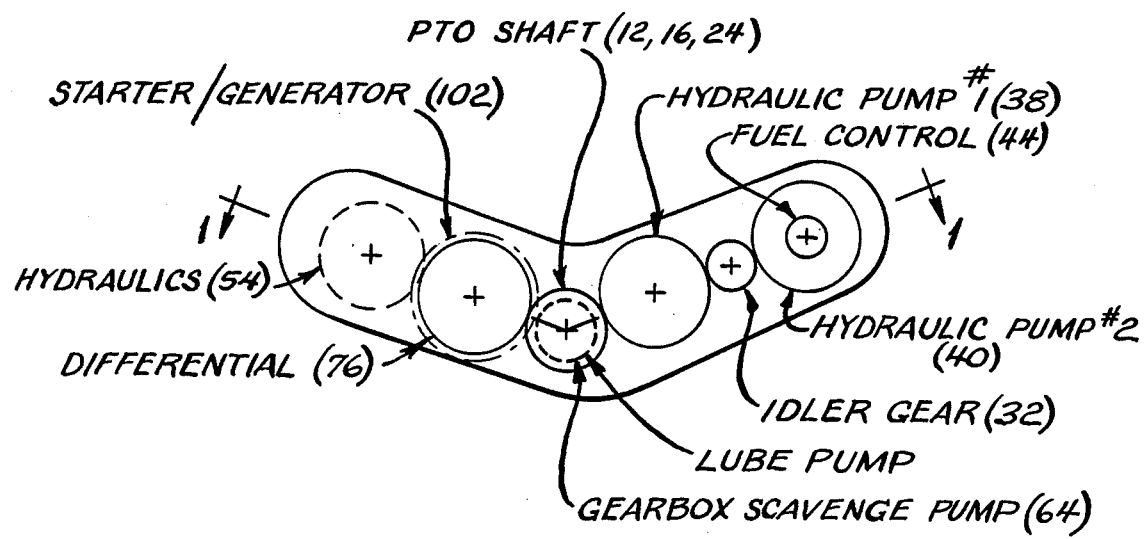
FIG. 3 is a profile view of a typical gear box made according to the invention.

FIG. 3 illustrates that in a gear box assembly made according to the invention, the frontal area is basically determined by the periphery of the gear box itself as opposed to the periphery of one or more of the accessory items mounted thereon. By way of example, the diameter of the starter generator 102 shown in FIG. 3 is only slightly greater than would be the diameter for a generator only of similar capacity. However, were the generator 102 in FIG. 3 replaced with a conventional IDG, the frontal area would increase, thus contributing to increased aerodynamic drag.

In addition to the reduction in frontal area mentioned previously, perhaps the most important advantage of the invention is in terms of weight reduction. By locating the differential 76 within the gear box 20, gears and output splines conventionally employed in an IDG have been eliminated along with their weight. As alluded to previously, housing material is more efficiently utilized and components such as a deaerator and IDG heat exchangers are eliminated. Where a combination starter generator such as shown at 102 is employed, the weight of a conventional air turbine starter is also eliminated.

The invention allows the location of the differential 76 and starter generator 102 with respect to a gear box sump to be optimized to reduce heat rejection arising from lubricant churning losses. Conversely, in conventional IDG's, packaging constraints frequently impede such optimization.

The invention additionally provides for excellent starting capabilities for a turbine without the need of clutches as are conventionally employed. Thus, reliability of the system operating in the starting mode is improved by reason of the elimination of clutches. As a result of the packaging provided by the invention, components such as the differential 76, which experience has shown to be extremely reliable, are isolated from less reliable components and are, therefore, less susceptible to costly secondary damage during a failure. Similarly, the cost of aircraft ownership is reduced since a failure no longer results in the removal from service of an entire IDG. Rather, only that component that experienced the failure need be removed and identification of the failure is also simplified by reason of the simplified mechanism.

Finally, it can be appreciated from a consideration of FIG. 1 that overhung movements are reduced from those found in systems employing in-line IDG's or side-by-side IDG's. In particular, an in-line IDG would typically have a length equal to the sum of the length of the hydraulic speed trimmer 54 and the starter/generator 102. This relatively long length will provide a relatively long moment arm over which the center of gravity of the IDG would be acting thereby producing a relatively large overhung moment. However, according to the invention, the hydraulic speed trimmer 54 and the starter/generator 102 are mounted at different locations on the gear box housing and not on one another. Consequently, the moment arm, over which their respective weights operate, is shortened considerably. As a result, a lesser amount of material may be utilized in constructing the gear box housing 20 as a lesser strength requirement is present.

We claim:

1. In a power plant including a turbine with a shaft, and a power take-off from the shaft, a gear box and accessory unit comprising:
   a first housing for said gear box;
   an input shaft extending into said first housing and connectable to said power take-off;
   a differential within said first housing including a carrier shaft mounting first and second meshed planet gears, a control ring gear meshed with one of said planet gears and an input/output ring gear meshed with the other of said planet gears, said carrier shaft being coupled to said input shaft;
   a second housing containing a hydraulic speed trimmer and mounted on the exterior of said first housing and having two hydraulically interconnected hydraulic pump/motor units, said units each having a shaft entering said first housing and coupled to a respective one of said carrier shaft and said control ring gear, and a displacement control for at least one of said units; and
   a third housing containing a starter/generator and mounted on the exterior of said first housing and having a shaft extending into said first housing and coupled therein to said input/output ring gear;
   a fuel system drive gear within said first housing and coupled to said input shaft, said fuel system drive gear being operable to drive a fuel pump mounted on the exterior of said first housing;
   a heat exchanger including a liquid flow path in heat exchange relation with said hydraulic speed trimmer and said second housing; and
   means defining a fuel flow path connected to said pump and including said liquid flow path whereby fuel may serve as a coolant for cooling said hydraulic speed trimmer.

2. The power plant of claim 1 wherein said liquid flow path includes liquid passages in a wall of said second housing.

3. The power plant of claim 1 wherein said hydraulic speed trimmer includes a start charge pump and a running charge pump, said start charge pump being operative to provide hydraulic fluid to said speed trimmer during operation of said starter/generator as a starter and said running charge pump being operative to provide hydraulic fluid to said speed trimmer during operation of said starter/generator as a generator; and further including an integral control piston/spool valve for porting hydraulic fluid to said speed trimmer from either said start charge pump or said running charge pump.

4. In a power plant including a turbine with a shaft, and a power take-off from the shaft, a gear box and accessory unit comprising:
   a first housing for said gear box;
   an input shaft including a first gear within said first housing and connectable to said power take-off;
   a differential within said first housing including a carrier shaft having a second gear meshed with said first gear and mounting meshed planet gears, a control ring gear meshed with one of said planet gears and an input/output ring gear meshed with the other of said planet gears;
   a second housing containing a hydraulic speed trimmer and mounted on the exterior of said first housing and having two hydraulically interconnected hydraulic pump/motor units, at least one of said units being a variable displacement unit, said units each having a shaft entering said first housing and respectively mounting third and fourth gears within said first housing with said third gear meshed with said second gear and said fourth gear meshed with said control ring gear, and a displacement control for at least one of said units; and
   a third housing containing a starter/generator and mounted on the exterior of said first housing and having a shaft extending into said first housing and mounting a fifth gear coupled therein to said input/output ring gear.

* * * * *